US 11,618,939 B2

United States Patent
Han et al.

(10) Patent No.: US 11,618,939 B2
(45) Date of Patent: Apr. 4, 2023

(54) GALVANIZED STEEL SHEET HAVING EXCELLENT PLATING ADHESION AND CORROSION RESISTANCE

(71) Applicant: POSCO, Pohang-si (KR)

(72) Inventors: Do-Kyeong Han, Incheon (KR); Heung-Yun Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 17/296,787

(22) PCT Filed: Nov. 27, 2019

(86) PCT No.: PCT/KR2019/016475
§ 371 (c)(1),
(2) Date: May 25, 2021

(87) PCT Pub. No.: WO2020/111775
PCT Pub. Date: Jun. 4, 2020

(65) Prior Publication Data
US 2022/0010420 A1    Jan. 13, 2022

(30) Foreign Application Priority Data

Nov. 28, 2018 (KR) .......................... 10-2018-0150031
Nov. 21, 2019 (KR) .......................... 10-2019-0150456

(51) Int. Cl.
*C22C 18/04* (2006.01)
*C23C 2/06* (2006.01)
(Continued)

(52) U.S. Cl.
CPC .............. *C23C 2/06* (2013.01); *B32B 15/012* (2013.01); *B32B 15/013* (2013.01); *B32B 15/04* (2013.01);
(Continued)

(58) Field of Classification Search
CPC ... C23C 28/025; C23C 28/028; C23C 28/021; C23C 28/023; C23C 2/06; C23C 2/20;
(Continued)

(56) References Cited

U.S. PATENT DOCUMENTS

2013/0183541 A1    7/2013  Kim et al.
2013/0337287 A1   12/2013  Hirata et al.
(Continued)

FOREIGN PATENT DOCUMENTS

CN         103282533           9/2013
JP        2002-275611     *    9/2002
(Continued)

OTHER PUBLICATIONS

Machine Translation, Yoshihiro, JP 2003-055776, Feb. 2003. (Year: 2003).*

(Continued)

*Primary Examiner* — Michael E. La Villa
(74) *Attorney, Agent, or Firm* — Cantor Colburn LLP

(57) ABSTRACT

Provided is a galvanized steel sheet having excellent plating adhesion, having a plated layer with improved friction characteristics by means of a predetermined level of Fe elution, and having excellent corrosion resistance; and a manufacturing method therefor.

3 Claims, 5 Drawing Sheets

(a)

(b)

(51) Int. Cl.
| | |
|---|---|
| *C23C 2/26* | (2006.01) |
| *C23C 2/20* | (2006.01) |
| *B32B 15/01* | (2006.01) |
| *C23C 28/02* | (2006.01) |
| *C23C 30/00* | (2006.01) |
| *C22C 30/06* | (2006.01) |
| *C22C 21/10* | (2006.01) |
| *B32B 15/04* | (2006.01) |
| *B32B 15/18* | (2006.01) |
| *C23C 2/40* | (2006.01) |
| *C23C 2/12* | (2006.01) |
| *C23C 2/04* | (2006.01) |
| *C22C 18/00* | (2006.01) |

(52) U.S. Cl.
CPC ............ *B32B 15/043* (2013.01); *B32B 15/18* (2013.01); *C22C 18/00* (2013.01); *C22C 18/04* (2013.01); *C22C 21/10* (2013.01); *C22C 30/06* (2013.01); *C23C 2/04* (2013.01); *C23C 2/12* (2013.01); *C23C 2/20* (2013.01); *C23C 2/26* (2013.01); *C23C 2/40* (2013.01); *C23C 28/021* (2013.01); *C23C 28/023* (2013.01); *C23C 28/025* (2013.01); *C23C 28/028* (2013.01); *C23C 30/00* (2013.01); *C23C 30/005* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24959* (2015.01); *Y10T 428/24967* (2015.01); *Y10T 428/265* (2015.01)

(58) Field of Classification Search
CPC .... C23C 2/26; C23C 2/12; C23C 2/04; C23C 2/40; C23C 30/00; C23C 30/005; B32B 15/013; B32B 15/012; B32B 15/04; B32B 15/043; B32B 15/18; C22C 18/04; C22C 18/00; C22C 30/06; C22C 21/10; Y10T 428/12757; Y10T 428/12799; Y10T 428/12951; Y10T 428/12958; Y10T 428/12972; Y10T 428/12979; Y10T 428/12993; Y10T 428/24967; Y10T 428/2495; Y10T 428/265; Y10T 428/24959

See application file for complete search history.

(56) References Cited

U.S. PATENT DOCUMENTS

| | | | |
|---|---|---|---|
| 2018/0002797 | A1* | 1/2018 | Oh ................ B32B 15/012 |
| 2018/0237897 | A1 | 8/2018 | Hashimoto et al. |
| 2019/0100831 | A1 | 4/2019 | Oh et al. |
| 2021/0010106 | A1 | 1/2021 | Kim et al. |

FOREIGN PATENT DOCUMENTS

| | | | |
|---|---|---|---|
| JP | 2003055776 A | | 2/2003 |
| JP | 2003-171753 | * | 6/2003 |
| JP | 2006009100 | | 1/2006 |
| KR | 20120076111 | | 7/2012 |
| KR | 20130017414 | | 2/2013 |
| KR | 20140002740 | | 1/2014 |
| KR | 20150051840 | | 5/2015 |
| KR | 20150066339 | | 6/2015 |
| KR | 20150074882 | | 7/2015 |
| KR | 20150074975 | | 7/2015 |
| KR | 20160078912 | | 7/2016 |
| KR | 20170105092 | | 9/2017 |
| KR | 20190078509 | | 7/2019 |
| WO | WO 2016/105163 A1 | * | 6/2016 |
| WO | 2017203343 | | 11/2017 |

OTHER PUBLICATIONS

Machine Translation, Kim, KR 1020150051840, May 2015. (Year: 2015).*
Machine Translation, Endo, JP 2002-275611, Sep. 2002. (Year: 2002).*
Machine Translation, Suzuki, JP 2003-171753, Jun. 2003. (Year: 2003).*
International Search Report—PCT/KR2019/016475 dated Mar. 10, 2020.
EP Extended European Search Report dated Nov. 11, 2021 re: Application No. PCT/KR2019/016475, pp. 1-9.
Japanese Office Action—Japanese Application No. 2021-529848 dated Jul. 19, 2022.
Chinese Office Action—Chinese Application No. 201980078052.1 issued on Oct. 26, 2022, citing WO 2016/105163, JP 2002-275611, JP 2003-055776, and CN 103282533.
Third Party Observation—European Application No. 19888373.8 dated Jan. 3, 2023, citing KR 10-2015-0074975.

* cited by examiner (a)

(b)

(a)

(b)

(a)

(b)

(a)

(b)

(a)

(b)

GALVANIZED STEEL SHEET HAVING EXCELLENT PLATING ADHESION AND CORROSION RESISTANCE

TECHNICAL FIELD

The present disclosure relates to a galvanized steel sheet, and more particularly, to a galvanized steel sheet having excellent plating adhesion and corrosion resistance, and a manufacturing method therefor.

BACKGROUND ART

The existing hot-dip galvanized steel sheet includes an Fe—Al inhibition layer formed at an interface between a base steel sheet and a plating layer, and the inhibition layer is known to secure plating adhesion at the interface between the base steel sheet and the plating layer and inhibit Fe diffusion due to a concentration gradient from the base metal into the plating layer.

If the inhibition layer is not continuously formed at the interface between the base metal and the plating layer, Fe in the base metal may be eluted into the plating layer, which causes the plating layer to be peeled off due to a degradation of plating adhesion. Therefore, in order to secure plating adhesion of a certain level or higher, the inhibition layer has to be continuously formed.

Meanwhile, when Fe in the base metal diffuses into the plating layer, an effect of friction characteristics such as improvement of roughness and surface roughness of the plating layer may be obtained.

However, when the inhibition layer is continuously formed at the interface between the base metal and the plating layer, diffusion of Fe is inhibited and there are many restrictions in using the effect of frictional characteristics.

Thus, it is necessary to develop a technology for a method that may simultaneously obtain the effect of Fe diffusion, while maintaining plating adhesion.

RELATED ART DOCUMENT

[Patent Document]
(Patent document 1) Korean Patent Laid-Open publication No. 10-2015-0074882

DISCLOSURE

Technical Problem

An aspect of the present disclosure may provide a galvanized steel sheet having excellent plating adhesion, having improved friction characteristics of the plating layer due to a certain level of Fe elution, and having excellent corrosion resistance, and a method of manufacturing the same.

The subject of the present disclosure is not limited to the aforementioned contents. A person skilled in the art to which the present disclosure pertains may not have any difficulty in understanding an additional subject of the present disclosure from the contents throughout the present disclosure.

Technical Solution

According to an aspect of the present disclosure, a galvanized steel sheet having excellent plating adhesion and corrosion resistance includes: a base steel sheet and a galvanized layer formed on at least one surface of the base steel sheet, wherein the galvanized layer includes, by wt %, 5.1% to 35.0% of aluminum (Al), 4.0% to 25.0% of magnesium (Mg), and the balance of zinc (Zn) and other inevitable impurities, and an interface between the base steel sheet and the galvanized layer includes an Al—Fe inhibition layer having a thickness of 0.01 μm to 15 μm.

According to another aspect of the present disclosure, a method for manufacturing a galvanized steel sheet having excellent plating adhesion and corrosion resistance includes: preparing a galvanizing bath including, by wt %, 5.1% to 35.0% of aluminum (Al), 4.0% to 25.0% of magnesium (Mg), and the balance of zinc (Zn) and other inevitable impurities; dipping a base steel sheet in the galvanizing bath and performing plating to manufacture a galvanized steel sheet; and cooling the galvanized steel sheet, wherein a temperature of the galvanizing bath is higher than 555° C. and lower than 600° C., and a dipping temperature of the base steel sheet is higher than 565° C. and lower than 600° C.

Advantageous Effects

According to the present disclosure, a galvanized steel sheet having excellent plating adhesion, even if Fe elution from a base iron into a plating layer occurs, may be provided.

In addition, the galvanized steel sheet of the present disclosure will not only have excellent corrosion resistance but also have an effect of inducing improved workability as friction characteristics of the plating layer are improved.

BEST MODE FOR INVENTION

Figure 1:
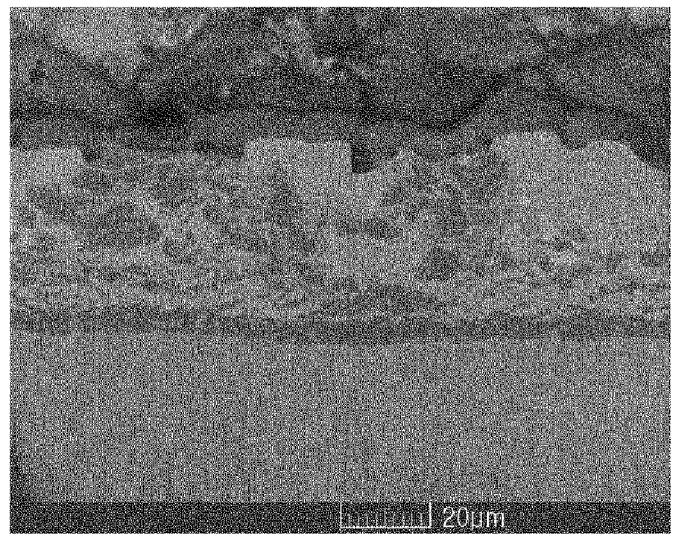
FIG. 1 shows photographs of observing cross-sections of Inventive Example 1 and Comparative Example 5 according to an embodiment of the present disclosure.
Figure 1:
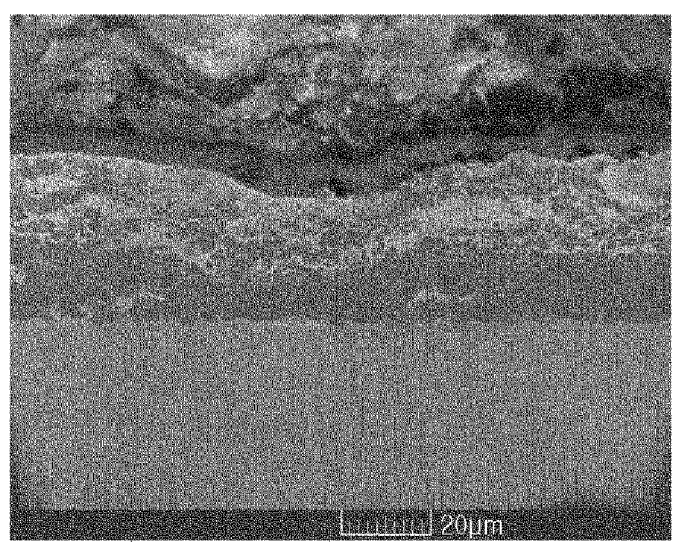

The inventors thereof application studied in depth a method for improving friction characteristics and corrosion resistance of a plating layer, while maintaining plating adhesion of a galvanized steel sheet.

As a result, the inventors thereof application found that a galvanized steel sheet having intended physical properties can be provided by configuring a plating layer such that Fe diffused from base iron has a concentration gradient in the plating layer by optimizing an alloy composition of a plating bath and plating conditions (different from the related art in which an Fe—Al alloy layer is formed in an interface between a base steel sheet (base iron) and a plating layer), and completed the present invention.

Hereinafter, the present disclosure will be described in detail.

A galvanized steel sheet having excellent plating adhesion and corrosion resistance according to an aspect of the present disclosure may include a base steel sheet and a galvanized layer formed on at least one surface of the base steel sheet.

In the present disclosure, the type of base steel sheet is not particularly limited, and for example, the base steel sheet may be a Fe-based base steel sheet, i.e., a hot-rolled steel sheet or a cold-rolled steel sheet, which is used as a base of a general galvanized steel sheet. However, hot-rolled steel sheets have a large amount of oxidized scales on surfaces thereof, and these oxidized scales lower plating adhesion to deteriorate plating quality, and thus, a hot-rolled steel sheet from which the oxidized scales are removed in advance with an acid solution may be used as a base steel sheet. As an example, carbon steel, ultra-low carbon steel, and high manganese steel used as materials for automobiles may be used.

Meanwhile, the galvanized layer may be formed on one surface or both surfaces of the base steel sheet.

The galvanized layer may include, by wt %, 5.1% to 35.0% of aluminum (Al), 4.0% to 25.0% of magnesium (Mg), and the balance of zinc (Zn) and other inevitable impurities, which may be formed from a plating bath including Al, Mg, and the balance of Zn and other inevitable impurities with the above contents.

Mg in the galvanized layer is an element that plays a very important role in improving corrosion resistance of the plating layer. Mg contained in the plating layer inhibits the growth of a zinc oxide-based corrosion product having less effect of improving corrosion resistance in a severe corrosive environment and stabilizes a zinc hydroxide-based corrosion product which is dense and has a high effect of improving corrosion resistance, on the surface of the plating layer.

If the content of Mg is less than 4.0%, the effect of improving corrosion resistance by the formation of Zn—Mg-based compounds cannot be sufficiently obtained, whereas if the content of Mg exceeds 25.0%, the effect of improving corrosion resistance is saturated and Mg oxidizable dross may be excessively formed on a surface of the plating bath.

Therefore, in the present disclosure, Mg is preferably contained in an amount of 4.0% to 25.0% in the galvanized layer. Mg may be advantageously contained in an amount of 5.1% or more, and more advantageously in an amount of 9.0% or less.

Al in the galvanized layer is added for the purpose of reducing dross caused due to Mg oxidation reaction in a hot-dip zinc alloy plating bath to which Mg is added, and Al is combined with Zn and Mg to advantageously improve corrosion resistance of the plated steel sheet.

If the Al content is less than 5.1%, the effect of preventing oxidation of a surface layer of the plating bath based on the addition of Mg is insufficient and the effect of improving corrosion resistance cannot be sufficiently obtained. Meanwhile, if the Al content exceeds 35.0%, the elution amount of Fe from the steel sheet dipped in the plating bath may increase rapidly to form Fe alloy dross, and further, a Zn/Al binary eutectoid phase is formed in the plating layer to degrade the effect of improving corrosion resistance of Mg with respect to a cross-sectional portion and a coated portion.

Therefore, in the present disclosure, Al is preferably contained in an amount of 5.1% to 35.0% of Al in the galvanized layer, and more advantageously in an amount of 11% to 15%.

As described above, in the present disclosure, the galvanized layer may be referred to as a Zn—Al—Mg-based alloy plating layer that contains a certain amount of Al, Mg and Zn and inevitable impurities as the balance, and may have a thickness of 20 μm to 40 μm, preferably, a thickness of 20 μm to 35 μm.

The galvanized steel sheet of the present disclosure may include an Al—Fe inhibition layer having a thickness of 0.01 μm to 15 μm at an interface between the base steel sheet and the galvanized layer, and the Al—Fe-based inhibition layer is preferably a $FeAl_3$ alloy phase.

Specifically, the Al—Fe-based inhibition layer may be interposed between the base iron and the plating layer and may serve to impart adhesion between the base iron and the alloy plating layer. In particular, when the galvanized steel sheet is formed, the Al—Fe-based inhibition layer may prevent peeling of the plating layer, thereby further improving workability.

Meanwhile, the Al—Fe inhibition layer preferably satisfies a thickness variation of 0.01 μm to 3 μm. If the thickness variation of the Al—Fe inhibition layer exceeds 3 μm, the inhibition layer is formed to discontinuous and the effect of plating adhesion by the inhibition layer cannot be sufficiently obtained. It is most preferable that the thickness variation of the Al—Fe inhibition layer is 0, but in the present disclosure, Fe is diffused from the base iron into the plating layer as described later, and in consideration thereof, a lower limit of the thickness variation is limited to 0.01 μm.

The galvanized layer of the present disclosure includes a first region having an Fe content of 40% to 95% therein and a second region having an Fe content of 0.01% or more to less than 40%, and mainly includes Fe diffused (eluted) from the base iron into the plating layer.

The first region and the second region are formed on the Al—Fe inhibition layer, and the first region mainly exists adjacent to the base iron in the galvanized layer and the second region mainly exists adjacent to a surface of the galvanized layer. Accordingly, the second region may be formed in an area fraction of 0.01% to 40% on the surface layer portion of the galvanized layer.

Referring to FIG. 1, in the drawing illustrating an example of the Inventive Example, a portion continuously darkened at the interface between the base iron and the plating layer is the first region, and the remaining region up to a surface layer of the plating layer excluding the first region is the second region.

In the present disclosure, in the galvanized layer, the first region and the second region may be formed over the entire thickness of the plating layer, but a size, shape, and fraction (the fraction occupied in the cross-section or surface of the plating layer) are not particularly limited. It should be noted that, in the case of the plating conditions proposed in the present disclosure, the regions according to the Fe content are formed to be distinguished from each other as described above.

As described above, in the galvanized layer of the present disclosure, despite the diffusion of Fe into the plating layer from the base iron, the Al—Fe inhibition layer is continuously formed at the interface between the base iron and the plating layer, so that plating adhesion is excellent and surface characteristics of the plating layer may be improved by the Fe diffusion (elution) to have surface roughness (Ra) of 3 μm to 4 μm.

That is, since high surface roughness (Ra), compared to the existing galvanized material, is obtained, friction and lubrication properties may be improved, so that there is an advantageous effect in improving workability during subsequent machining.

Hereinafter, a method of manufacturing a galvanized steel sheet having excellent plating adhesion and corrosion resistance according to another aspect of the present disclosure will be described in detail.

The galvanized steel sheet of the present disclosure may be manufactured by a method including operations of preparing a galvanizing bath together with a base steel sheet; dipping the base steel sheet in the galvanizing bath and performing plating to prepare a galvanized steel sheet; and cooling the galvanized steel sheet.

In this case, the galvanized layer may be formed on one side or both sides of the base steel sheet.

As mentioned above, in order to obtain the galvanized layer intended in the present disclosure, the galvanizing bath may preferably include, by wt %, 5.1% to 35.0% of aluminum (Al), 4.0% to 25.0% of magnesium (Mg), and the balance of zinc (Zn) and other inevitable impurities. More advantageously, Al may be included in an amount of 11-15%. In addition, more advantageously, Mg may be included in an amount of 5.1% or more and may be included in an amount of 9.0% or less.

In the present disclosure, in performing plating by dipping the base steel sheet in the galvanizing bath having the aforementioned alloy composition, a temperature of the galvanizing bath is higher than 555° C. and lower than 600° C., and a dipping temperature of the base steel sheet is higher than 565° C. and lower than 600° C.

In general, in the case of manufacturing a galvanized steel sheet, the temperature of the plating bath is controlled to a temperature above a melting point and not exceeding a maximum of 500° C., whereas, in the present disclosure, an intended plating layer may be formed by controlling the temperature of the galvanizing bath to be relatively high.

Specifically, in the present disclosure, when plating is performed by dipping the base steel sheet in the galvanizing bath, it is necessary to provide sufficient thermal energy so that the Al—Fe inhibition layer is formed at the interface between the base iron and the plating layer and, at the same time, Fe in the base iron can be diffused into the plating layer, which, however, cannot be achieved if the temperature of the galvanizing bath is controlled to 555° C. or lower or if the dipping temperature of the base steel sheet is controlled to 565° C. or lower. That is, in this case, the Al—Fe inhibition layer may be formed to be discontinuous or Fe diffusion into the plating layer does not occur sufficiently, so that a galvanized layer having intended physical properties cannot be obtained.

Meanwhile, if the temperature of the galvanizing bath is 600° C. or higher, there is a high possibility that the base steel sheet and the equipment inside the plating bath will be eroded, resulting in a shortening of the life of the equipment. In addition, if the temperature of the galvanizing bath is too high or if the dipping temperature of the base steel sheet is 600° C. or higher, the surface of the plated material is deteriorated due to an increase in Fe alloy dross.

More preferably, the dipping temperature of the base steel sheet may be controlled to be higher by 5° C. to 20° C. than the temperature of the galvanizing bath.

In the present disclosure, plating may be performed with a plating amount of 130 to 180 g/m$^2$, from which a galvanized layer having a thickness of 20 µm to 40 µm may be obtained.

After plating is completed in the galvanizing bath as described above, the obtained plated material may be cooled, and in the present disclosure, in order to obtain the galvanized layer having the first region and the second region as described above, cooling may be performed by stages.

Specifically, the cooling includes a first cooling operation of cooling at a cooling rate of 0.01 to 5° C./s to 230° C. to 270° C. and a second cooling operation of cooling at a cooling rate of 0.05° C. to 20° C./s to room temperature.

In the present disclosure, a solid-liquid phase is appropriately formed while sufficiently solidifying a single phase through the first cooling process, and then the solid-liquid phase may be completely solidified by performing second cooling at a cooling rate higher than the cooling rate of the first cooling.

In the present disclosure, a method of performing cooling including moisture is excluded, and cooling may be performed by spraying gas, preferably.

Here, the gas is sprayed into both front and rear surfaces of the plated material, and a desired cooling rate may be secured by adjusting pressure of the gas. For example, an inert gas such as nitrogen or argon may be used as the gas.

Meanwhile, the method may further include gas-wiping the plated material on which the plating layer is formed, prior to performing the cooling. The gas wiping is a process of adjusting the amount of plating, and a method thereof is not particularly limited.

Here, air or nitrogen may be used as gas to be used, and in this case, nitrogen is preferably used. The reason is because when air is used, Mg oxidation first occurs on the surface of the plating layer, which may cause surface defects in the plating layer.

By completing the series of processes described above, the galvanized steel sheet according to one aspect of the present disclosure including a galvanized layer including the first region and the second region described above formed in the plating layer, while including the Al—Fe inhibition layer continuously formed at the interface between the base iron and the plating layer may be obtained.

The galvanized steel sheet of the present disclosure has excellent plating adhesion and corrosion resistance, and in addition, since the galvanized steel sheet has improved friction characteristics on the surface of the plating layer, an effect of improving workability at the time of subsequent forming may also be obtained.

MODE FOR INVENTION

Hereinafter, the present disclosure will be described in more detail through examples. However, it should be noted that the following examples are for illustrative purposes only and are not intended to limit the scope of the present disclosure. This is because the scope of the present disclosure is determined by matters described in the claims and matters reasonably inferred therefrom.

Example

A cold-rolled steel sheet (0.0016% C-0.081% Mn-0.002% Si—0.0091% P-0.0043% S-0.036% Sol. Al), as a base steel sheet, having a thickness of 1.0 mm, a width of 110 mm, and a length of 200 mm was prepared as a plating test piece, on which plating was performed under the conditions shown in Table 1 below to manufacture each galvanized steel sheet. Here, cooling after plating was performed by spraying nitrogen into front and rear surfaces of the steel sheet, first cooling was terminated at 250° C., and second cooling was performed to room temperature.

TABLE 1

| Classification | Composition of plating bath (wt %) | | Plating condition | | | | Thickness of plating layer (μm) |
|---|---|---|---|---|---|---|---|
| | Al | Mg | Temperature of plating bath (° C.) | Dipping temperature (° C.) | First cooling rate (° C./s) | Second cooling rate (° C./s) | |
| Inventive Example 1 | 24 | 9 | 557 | 567 | 2.9 | 10 | 32 |
| Inventive Example 2 | 24 | 4 | 557 | 567 | 2.9 | 10 | 28 |
| Inventive Example 3 | 24 | 5.1 | 557 | 567 | 2.9 | 10 | 29 |
| Comparative Example 1 | 24 | 4.5 | 545 | 560 | 2.9 | 10 | 34 |
| Comparative Example 2 | 24 | 5.5 | 550 | 565 | 2.9 | 10 | 36 |
| Comparative Example 3 | 24 | 3 | 557 | 567 | 2.9 | 10 | 25 |
| Comparative Example 4 | 24 | 3.8 | 557 | 567 | 2.9 | 10 | 27 |
| Comparative Example 5 | 24 | 3 | 555 | 565 | 2.9 | 10 | 29 |
| Comparative Example 6 | 24 | 3.8 | 555 | 565 | 2.9 | 10 | 28 |

(The balance of the composition of the plating bath in Table 1 is Zn and inevitable impurities.)

For each galvanized steel sheet manufactured according to the above, plating adhesion, surface characteristics, and corrosion resistance were evaluated.

First, in the case of Inventive Examples 1 to 3 in which not only the composition of the plating bath but also the plating steel sheet manufacturing process conditions satisfied the range of the present disclosure, it was possible to form a continuous Fe—Al inhibition layer at the interface between the base iron and the plating layer, it was possible to maintain friction/lubrication characteristics due to an increase in roughness, effectively inhibiting the plating layer from peeling off during forming and obtaining excellent corrosion resistance.

Meanwhile, in the case of Comparative Examples 1 and 2 in which the composition of the plating bath was within the range of the present disclosure but the plating steel sheet manufacturing process conditions were outside the range of the present disclosure, it was difficult to form a continuous Fe—Al inhibition layer due to low thermal energy required for Fe diffusion of the base steel sheet because of a low plating bath and dipping temperature. Therefore, friction/lubrication characteristics of the plating layer decreased due to the decrease in roughness, resulting in cracks in the form of branches in the plating layer after forming and a degradation of corrosion resistance due to the peeling off of the plating layer.

In addition, Comparative Examples 3 and 4 had a low Mg content compared to Inventive Example, so corrosion resistance of the surface and cross-sectional portions was not good.

In addition, in the case of Comparative Example 6 in which not only the composition components of the plating bath but also the manufacturing process conditions were outside the range of the present disclosure, it was difficult to form a continuous Fe—Al inhibition layer because thermal energy required for Fe diffusion of the base steel sheet was low. As a result, the friction/lubrication characteristics of the plating layer decreased due to the decrease in roughness, resulting in cracks in the form of branches in the plating layer after forming and a degradation of corrosion resistance due to the peeling off of the plating layer. Furthermore, the amount of Mg—Zn eutectoid formation was small, so corrosion resistance of the surface and the cross-sectional portion of the plating layer was degraded.

Meanwhile, in order to observe the cross-section of the galvanized steel sheet, the galvanized steel sheet was cut in a vertical direction (thickness direction) in a rolling direction, and then observed using a scanning electron microscope (SEM). FIG. 1 shows a photograph of observing the cross-section of the plating layer of Inventive Example 1 and Comparative Example 5 in an embodiment of the present disclosure.

As shown in FIG. 1, it can be seen that, in both Inventive Example 1 and Comparative Example 5, an Fe—Al inhibition layer was present between the base iron and the plating layer, and Fe diffusion into the plating layer occurred. However, in the case of Comparative Example 5, as the Fe—Al inhibition layer was formed to be discontinuous simultaneously while diffusion of Fe occurred, it is predicted that plating adhesion decreases.

Meanwhile, in observing the cross-section of the galvanized steel sheet, a cut surface was subjected to focused in beam (FIB), and a flat plate portion was coated with platinum, gold or carbon in order to protect the formed portion. FIG. 1 is a view illustrating a portion of a region coated on the flat plate portion together.

Figure 2:
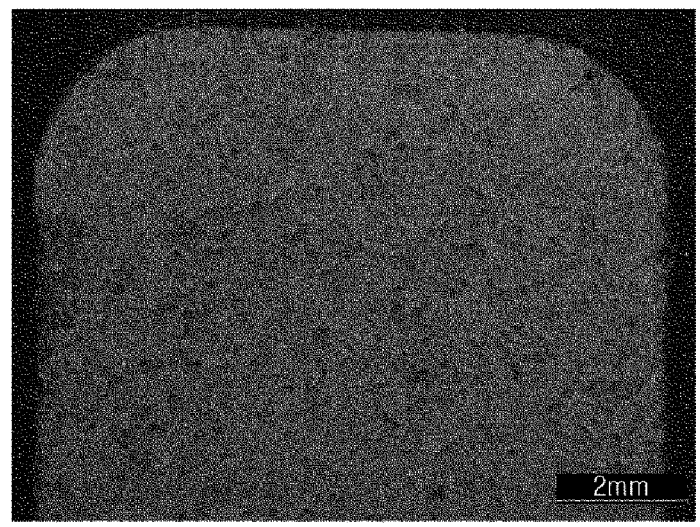
FIG. 2 shows results of a sealer-bending test of Inventive Example 1 and Comparative Example 5 according to an embodiment of the present disclosure (here, the scale bar is 2 mm).
Figure 2:
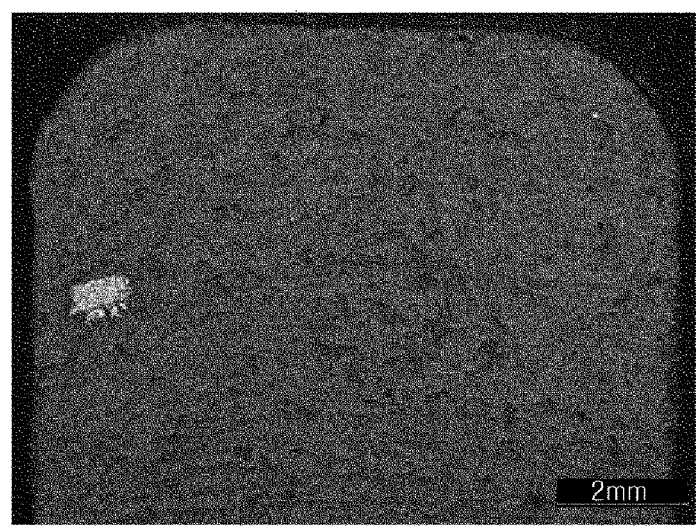

In addition, in order to evaluate plating adhesion of the galvanized steel sheet, a sealer-bending test was performed, and results thereof are shown in FIG. 2. FIG. 2 shows the results of the sealer-bending test of Inventive Example 1 in an embodiment of the present disclosure and Comparative Example 5 (here, the scale bar is 2 mm). In the sealer-bending test, an adhesive was applied to the plating layer of a mastic sealer (purple) and the flat plating layer, the mastic sealer and the flat plating layer were attached, a flat plate portion was bent at 90°, and the degree of plating layer transferred to the mastic sealer portion at the bent portion was evaluated. In this case, a picture of the mastic sealer portion captured with an optical microscope is shown in FIG. 2.

As shown in FIG. 2, in the case of Inventive Example 1, the plating layer was not peeled off, whereas, in Comparative Example 5, the plating layer was peeled off.

Figure 3:
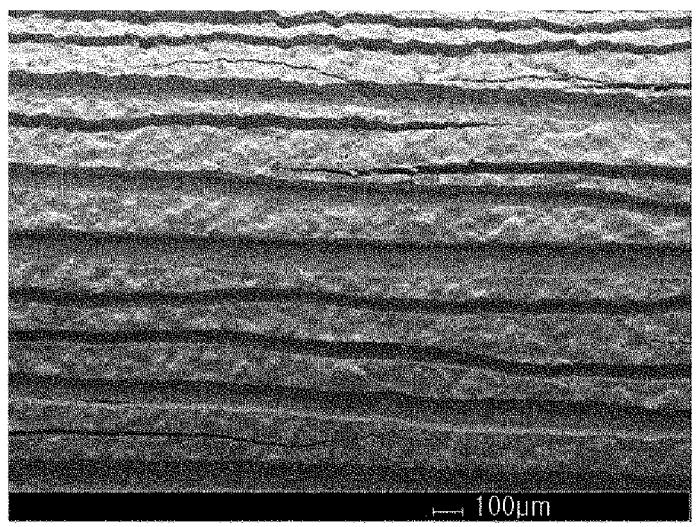
FIG. 3 shows photographs of observing a shape of cracks at an outer coiling portion of Inventive Example 1 and Comparative Example 5 after a bending test according to an embodiment of the present disclosure.
Figure 3:
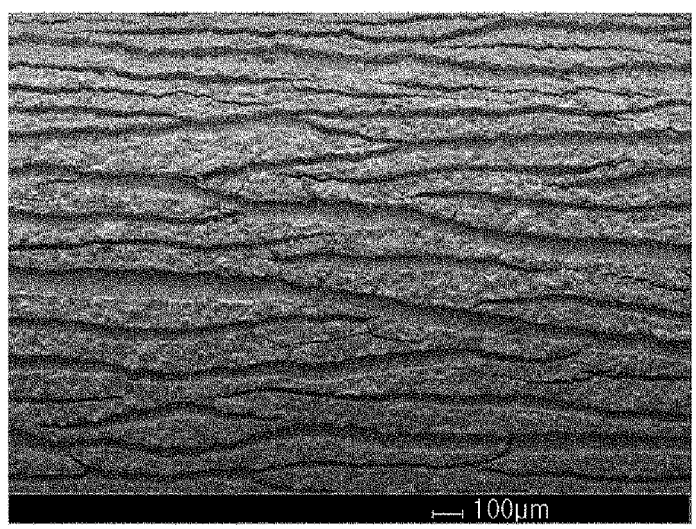

Also, after the bending test of the galvanized steel sheet was observed whether the occurrence of cracks in the outer coiling portion, the results are shown in FIG. 3 shows photographs of observing a shape of cracks at an outer coiling portion of Inventive Example 1 and Comparative Example 5 after a bending test according to an embodiment of the present disclosure. In this case, the photograph of the outer coiling portion captured with an electron scanning microscope after bending the plated material itself by 180 degrees in the bending test is shown in FIG. 3.

As shown in FIG. 3, in Inventive Example 1, cracks are formed in parallel in one direction, while, in Comparative Example 5, fracture and crack propagation behavior changing in a branch-type from a behavior formed in parallel in one direction can be observed. These results are expected to affect corrosion resistance of the formed portion.

Figure 4:
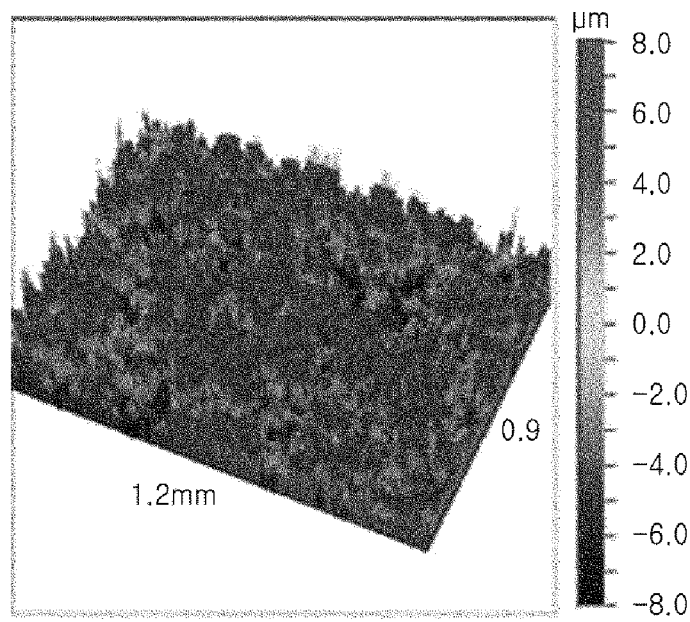
FIG. 4 shows results of 3D roughness scanning of surfaces of Inventive Example 1 and Comparative Example 5 according to an embodiment of the present disclosure.
Figure 4:
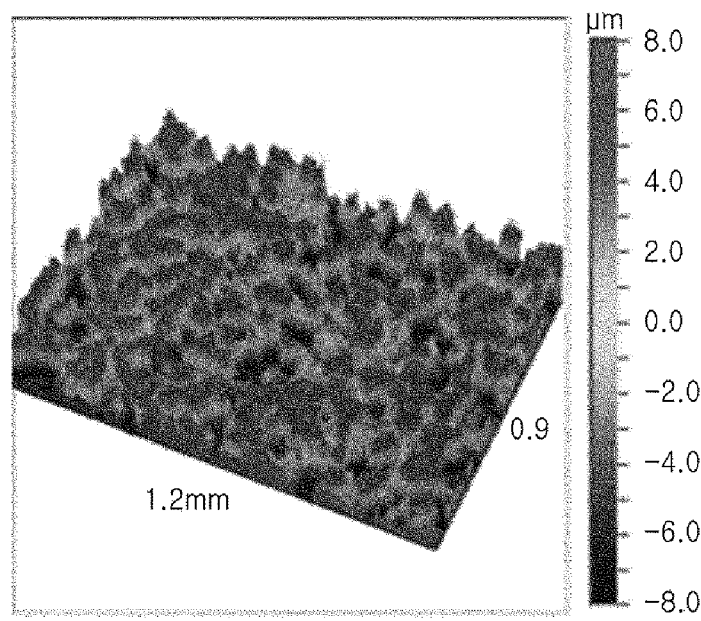

In addition, in order to confirm the surface characteristics of the galvanized steel sheet, the galvanized steel sheet was scanned in 3D roughness, and the results are shown in FIG. 4. FIG. 4 shows results of 3D roughness scanning of surfaces of Inventive Example 1 and Comparative Example 5 according to an embodiment of the present disclosure As shown in FIG. 4, Fe diffusion occurred throughout the plating layer, and in the case of Inventive Example 1 in which layers were separated according to the Fe concentration gradient in the plating layer, roughness and surface roughness were significantly improved compared to Comparative Example 5.

Figure 5:
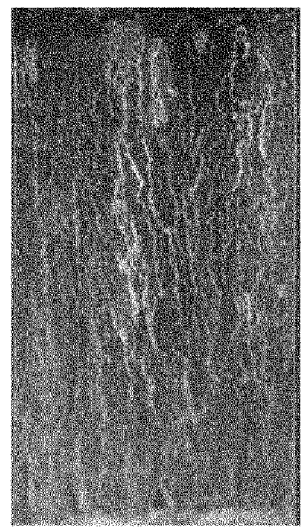
FIG. 5 shows photographs of surfaces of Inventive Example 1 and Comparative Example 5 after a salt spray test according to an embodiment of the present disclosure.
Figure 5:
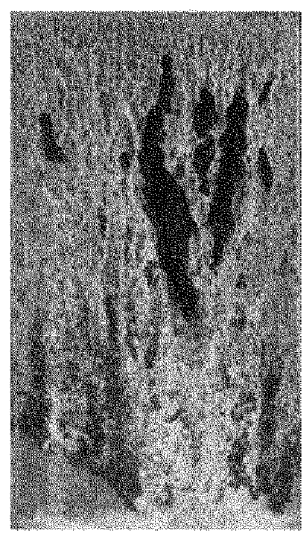

Further, FIG. 5 shows photographs of surfaces after a salt spray test was conducted on the plated steel sheets of Inventive Example 1 and Comparative Example 5 according to an embodiment of the present disclosure. Here, 5 vol. % of NaCl brine (35° C.) was placed in a chamber, the brine was sprayed onto each plated material (specimen having a size of 150×70 (mm$^2$)) at 1.55 ml per hour, and corrosion resistance was evaluated based on a time at which red rust occurred.

As shown in FIG. 5, it can be seen that Inventive Example 1 maintained corrosion resistance for 1200 hours in a corrosive environment, whereas, in Comparative Example 5, corrosion occurred significantly.

The invention claimed is:

1. A galvanized steel sheet having excellent plating adhesion and corrosion resistance, the galvanized steel sheet comprising:
   a base steel sheet and a galvanized layer formed on at least one surface of the base steel sheet,
   wherein the galvanized layer includes, by wt %, 5.1% to 35.0% of aluminum (Al), 4.0% to 25.0% of magnesium (Mg), and a balance of zinc (Zn) and inevitable impurities, and an interface between the base steel sheet and the galvanized layer includes an Al-Fe inhibition layer having a thickness of 0.01 μm to 15 μm and
   wherein the galvanized layer includes a first region in which an Fe content is 40 wt % to 95 wt % and a second region in which an Fe content is 0.01 wt % or more and less than 40 wt %, the second region is formed by an area fraction of 0.01% to 40% on a surface layer portion of the galvanized layer, the first region exists adjacent to the base iron, and the second region exists adjacent to a surface of the galvanized layer.

2. The galvanized steel sheet of claim 1, wherein the galvanized layer includes, by wt %, 11% to 15% of aluminum (Al), 5.1% to 9.0% of magnesium (Mg), and a balance of zinc (Zn) and inevitable impurities.

3. The galvanized steel sheet of claim 1, wherein the galvanized layer has a surface roughness (Ra) of 3 μm to 4 μm.

\* \* \* \* \*